United States Patent [19]

Ormond

[11] 4,125,168
[45] Nov. 14, 1978

[54] LOAD CELLS FOR FLEXURE ISOLATED ELECTRONIC SCALE

[76] Inventor: Alfred N. Ormond, 11969 E. Rivera Rd., Santa Fe Springs, Calif. 90670

[21] Appl. No.: 821,631

[22] Filed: Aug. 4, 1977

[51] Int. Cl.² .......................... G01G 3/14; G01L 5/12
[52] U.S. Cl. .................................. 177/211; 73/141 A
[58] Field of Search ...................... 177/211; 73/141 A

[56] References Cited

U.S. PATENT DOCUMENTS

| | | | |
|---|---|---|---|
| 3,213,953 | 10/1965 | Flinth | 73/141 A X |
| 3,577,779 | 5/1971 | Laimins | 73/141 A |
| 3,994,161 | 11/1976 | Trozera | 177/211 X |
| 4,009,608 | 3/1977 | Ormond | 73/141 A |
| 4,020,686 | 5/1977 | Brendel | 177/211 X |
| 4,065,962 | 1/1978 | Shoberg | 73/141 A |

*Primary Examiner*—George H. Miller, Jr.
*Attorney, Agent, or Firm*—Ralph B. Pastoriza

[57] ABSTRACT

The scale includes a horizontal load plate and base plate supported in spaced parallel relationship by first and second generally rectangular members lying in vertical spaced planes extending between the load plate and base plate. Opposite end portions of each rectangular member are symmetrical about a vertical axis passing midway therethrough, these opposite end portions defining corner flexure supports connected between the vertically opposed corner portions of the load plate and base plate.

A load element in each of the corner flexure supporting means will flex under load and has strain gauges attached thereto to provide electrical read-out signals constituting a function of a force applied to the load plate. The design of each of the corner flexure supporting means is such that the strain gauges are isolated from extraneous strains resulting from off-center application of a force on the load plate.

4 Claims, 4 Drawing Figures

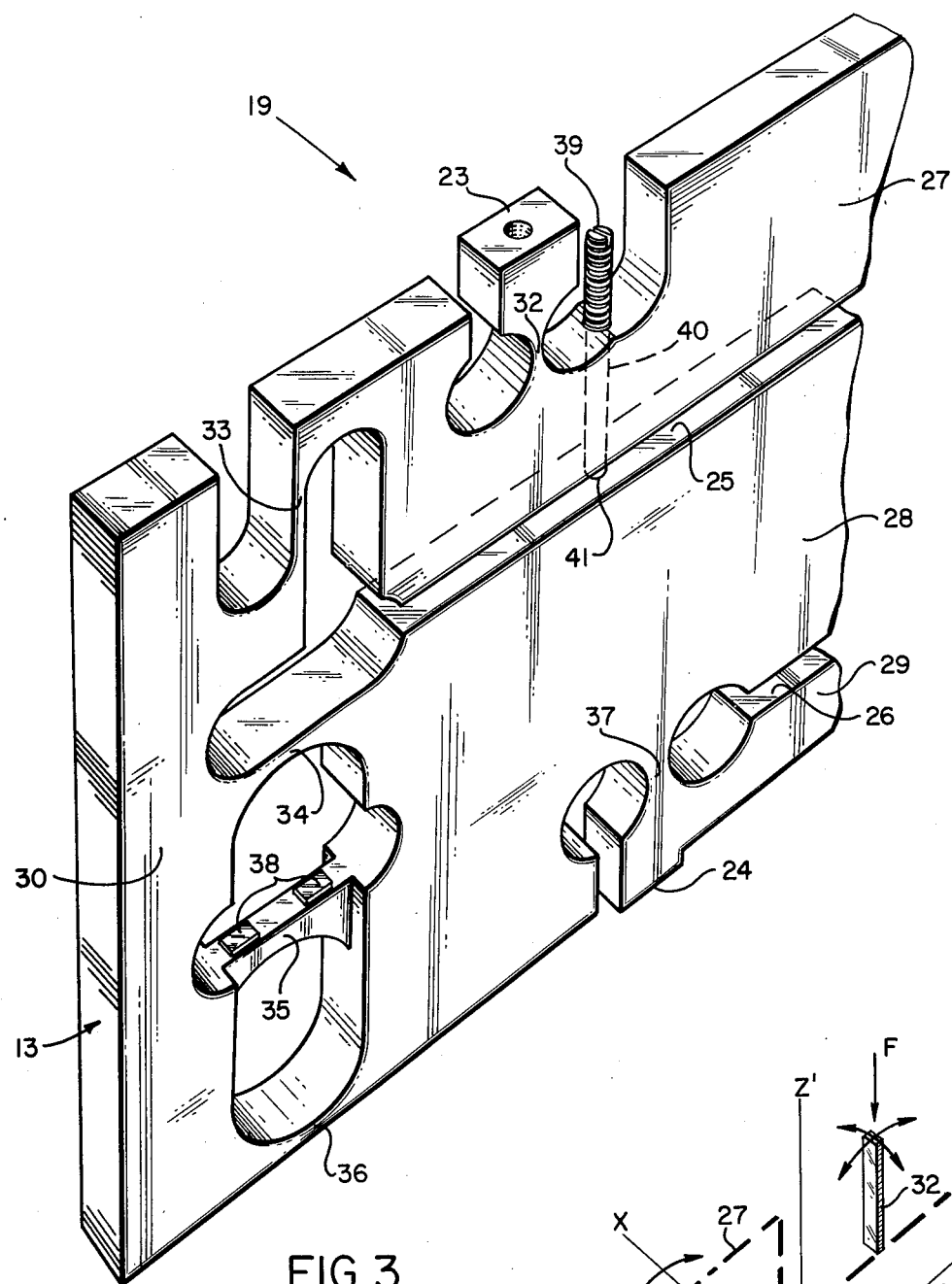
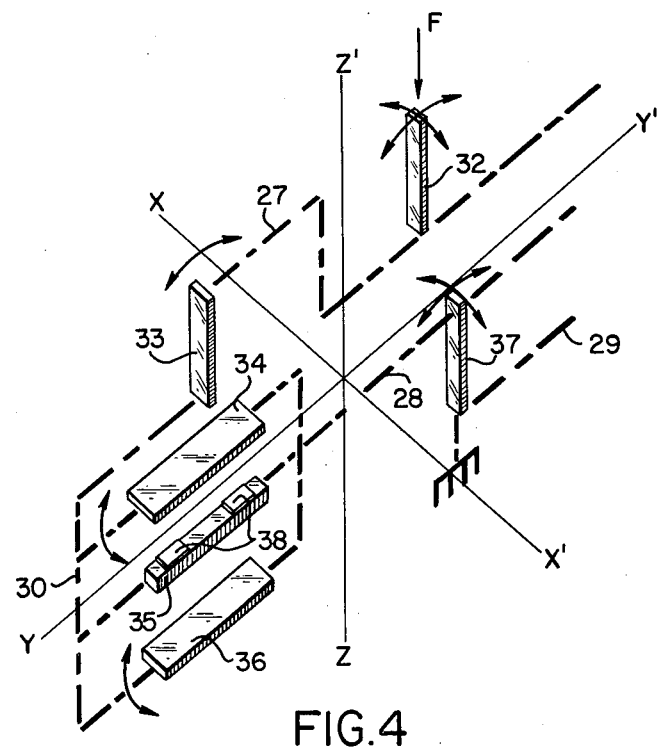
FIG. 3
FIG. 4

LOAD CELLS FOR FLEXURE ISOLATED ELECTRONIC SCALE

This invention relates generally to load cells and additionally, to a flexure isolated electronic scale utilizing such load cells for isolating extraneous strains from strain gauges secured to the load cells.

BACKGROUND OF THE INVENTION

It is common practice to utilize load cells for force measuring operations. Normally, the load cells may take the form of columns, shear plates or flexure webs having strain gauges affixed in a manner to provide an output signal indicative of a load applied to the load cell. In utilizing the load cells to measure a load or force, one or more cells are connected to a structure designed with suitable flexure supports such that only desired components or forces to be measured will be transmitted to the strain gauges on the load cells.

In my U.S. Pat. No. 3,985,025 issued Oct. 12, 1976, there is disclosed a platform type scale wherein there are provided integrally formed load cell bodies and flexure means which will isolate undesired forces from the strain gauges in the load cell. By providing such an integral arrangement, the expense of providing separate flexures and securing them between load cells and force applying structures or scale platforms is avoided. Further, the problems involved with isolating extraneous forces from the strain gauges themselves are avoided.

BRIEF DESCRIPTION OF THE PRESENT INVENTION

The heart of the present invention resides in a particularly designed integrally formed load cell including essentially, an end body portion receiving a load, a vertically stationary central body portion, and first, second and third parallel horizontal elements positioned respectively one below the other in spaced relationship connecting the end body portion to the central body portion. The first and third horizontal elements constitute horizontal flexure webs, the second element being disposed therebetween to function as a load element. Strain gauge means secured to this second horizontal element are responsive to strains developed therein resulting from a downwardly directed load on the end portion tending to move this end portion downwardly relative to the central body portion to provide electrical signals constituting a function of the load. The first and third horizontal flexure webs essentially constrain movement of the end body portion relative to the central body portion to a vertical rectilinear direction to isolate extraneous shear forces from the second horizontal element carrying the strain gauge means.

In the preferred embodiment of the present invention there is provided an additional end body portion connected to an opposite end of the central body portion by first, second and third horizontal elements identical to the first mentioned first, second and third horizontal elements to provide two load cells symmetrical with respect to a vertical axis passing midway through the central body portion, this central body portion with its connected end portions defining a first generally rectangular member. A second generally rectangular member with flexure mounted connected opposite end body portions identical to the first member is provided, these first and second members lying in vertical spaced planes between a horizontal load plate and a horizontal base plate to provide essentially a flexure isolated electronic scale.

In this preferred design, the particular flexure arrangement provided by the load cell construction is such that the strain gauges are isolated from extraneous strains and will provide an accurate read-out of an applied load or weight on the load plate even though such load may be applied off-center.

BRIEF DESCRIPTION OF THE DRAWINGS

A better understanding of this invention will be had by now referring to the accompanying drawings in which:

FIG. 3 is a greatly enlarged fragmentary perspective view of one of the corner flexure support means including the basic load cell unit used in the scale shown in FIG. 2; and, FIG. 4 is a schematic type diagram useful in explaining the functions of the various flexures incorporated in the corner flexure supporting means illustrated in FIG. 3.

DETAILED DESCRIPTION OF THE INVENTION

Figure 1:
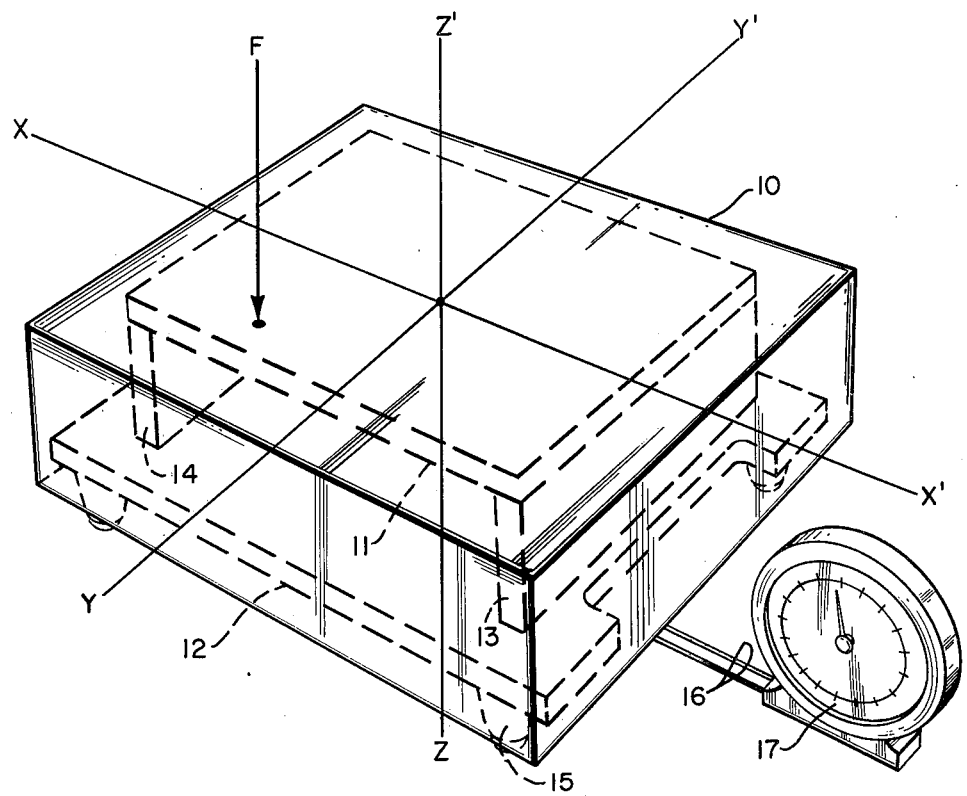
FIG. 1 is an overall perspective view of the flexure isolated electronic scale of this invention.

Referring first to FIG. 1, there is shown an enclosure or cover 10 defining a flat upper surface for receiving an object to be weighed. The weight of the object is symbolically illustrated by the arrow F and in the example shown, the weight is off-center from the center of the cover 10. This center is defined by the intersection point of orthogonal horizontal axes X-X' and Y-Y'. A vertical axis passing through the origin is designated Z-Z' and coincides with the center of the structure.

Within the enclosure 10 as indicated by the phantom lines is a horizontal rectangular shaped load plate 11 upon which the enclosure or cover 10 rests, and a horizontal rectangularly shaped base plate 12 disposed beneath the load plate in spaced parallel relationship. The lower peripheral portion of the enclosure or cover 10 resting on the load plate 11 terminates short of the underside of the base plate 12.

First and second generally rectangular members showing phantom lines 13 and 14 lie in vertical spaced planes to extend between the load plate 11 and base plate 12. The underside of the base plate 12 may include feet such as indicated at 15 resting on a solid surface, these feet extending below the lower edge of the enclosure or cover 10.

As will become clearer as the description proceeds, appropriate strain gauges are provided on the first and second rectangular members 13 and 14 to electrically connect through leads 16 to a read-out 17 for providing a visual indication of any weight or force F applied to the load plate 11 through the cover 10.

Figure 2:
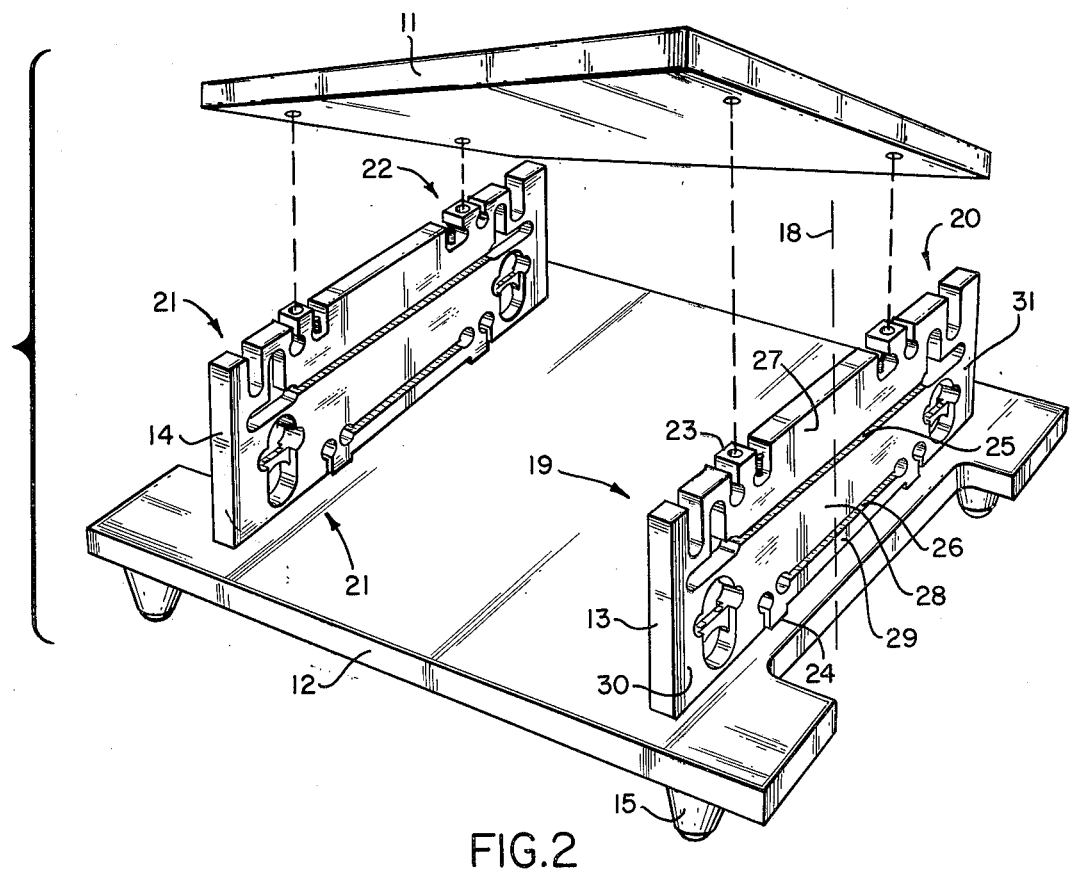
FIG. 2 is an exploded perspective view of the basic components making up the scale illustrated in phantom lines in FIG. 1.

Referring now to FIG. 2, it will be noted that opposite end portions of each rectangular member such as the member 13 are symmetrical about vertical axis 18 passing midway therethrough and defining corner flexure supporting means indicated generally by the arrows 19 and 20 for the rectangular member 13 and at 21 and 22 for the rectangular member 14. Each of the corner flexure supporting means such as 19 shown in FIG. 2 have upper and lower corner posts 23 and 24 connected between the vertically opposed corner portions of the load plate 11 and base plate 12.

Each of the rectangular members 13 and 14 themselves include cut-out portions such as indicated at 25 and 26 for the rectangular member 13 defining an horizontally running upper body portion 27, an horizontally running central body portion 28, a horizontally running lower body portion 29 and vertically running end body portions 30 and 31.

Since each of the corner flexure support means as designated by the arrows 19, 20, 21 and 22 are identical, a detailed description of one will suffice for all.

Thus, referring to the enlarged fragmentary perspective view of FIG. 3 illustrating in greater detail the corner flexure support means 19, it will be noted that various flexures are defined by appropriate cut-outs on the member. Thus, the flexure support means includes an upper vertical flexure bar 32 connecting the referred to upper corner post 23 to the upper body portion 27.

An upper vertical flexure web 33 in turn connects the upper body portion 27 to the end body portion 30.

First, second and third parallel horizontal elements 34, 35 and 36 respectively positioned one below the other in spaced relationship connect the end body portion 30 to the central body portion 28. The first and third elements 34 and 36 are flexure webs, the second horizontal element 35 being disposed therebetween to function as a load element.

A lower vertical flexure bar 37 connects the lower body portion 29 to the central body portion 28, a part of the lower body portion 29 defining the lower corner post 24. It will be understood that the upper corner post 23 and lower corner post 24 are secured respectively to vertically opposed corner portions of the load plate 11 and base plate 12 as depicted in FIG. 2.

The structure is completed by the provision of strain gauge means indicated at 38 in FIG. 3 secured to the second horizontal element 35. These strain gauge means are responsive to strains developed in the second horizontal load element 35 resulting from downward movement of the load plate towards the base plate; that is, a force exerted on the upper corner post 23 in a downward direction communicated by way of the flexures to the lower corner post 24. Such downward movement of the upper corner post 23 results from an applied force F on the load plate connected to this corner post and electrical signals developed by the strain gauge means 38 will constitute a function of the applied load or force.

The second horizontal element 35 is of greater thickness and thus stiffer than the first and third horizontal flexure webs 34 and 36 as will be evident from FIG. 3.

The functioning of the various flexure webs described in FIG. 3 can better be understood by reference to FIG. 4 wherein the respective flexure webs are represented by flat strips and designated by the same numerals employed in FIG. 3. The upper body portion 27, central body portion 28, lower body portion 29, and end body portion 30 are depicted by the heavy dashed lines numbered 27, 28, 29 and 30 in FIG. 4 so that the manner in which the various flexures connect these body portions will be evident.

The design of the corner flexure means as described in FIGS. 3 and 4 is such that the upper and lower flexure bars 32 and 37 function as universal flexures with greater resiliency about an axis normal to the plane of the rectangular member (axis X-X') than about a horizontal axis lying in the plane of the rectangular member (axis Y-Y').

The upper vertical flexure web 33, in turn, functions to isolate bending moments between the upper body portion 27 and the end body portion 30.

The first and third horizontal flexure webs 34 and 36 function to constrain movement of the end body portion 30 to a vertical rectilinear direction to isolate extraneous sheer forces from the second horizontal element 35 functioning as a load element for the strain gauges 38. The bending capabilities of the various flexures are schematically indicated by the double-headed arrows in FIG. 4.

As a consequence of the foregoing design, the strain gauges such as the strain gauges 38 at each of the corner flexure supporting means are isolated from extraneous strains resulting from off-center application of a force such as the force indicated at F in FIG. 1 on the load plate 11. For example, a load on the load plate referring back to FIGS. 1 and 2 if applied at the center of the load plate and even off-center, will tend to pull the upper corner posts of the rectangular members towards each other slightly, this motion being accommodated by the flexure bars 32 and 37 as described in FIGS. 3 and 4. The downward movement of the load plate towards the base plate is in turn accommodated by the first and third horizontal flexures 34 and 36 which, as described, constrain this movement to a vertical rectilinear direction thereby isolating the load element horizontally element 35 and associated strain gauges from extraneous sheers.

It has been found through extensive experimentation that provision of the various flexures as described in FIGS. 3 and 4 result in a consistent electrical signal for a given applied load even though such load may be off-center of the load plate 11.

As illustrated in FIG. 2 and in greater detail in FIG. 3, each of the corner flexure support means preferably includes a mechanical stop means between the upper body portion 27 and central body portion 28 to limit downward displacement of the load plate towards the base plate. This mechanical stop means takes the form of a threaded screw 39 passing through an appropriate threaded bore 40 as indicated in FIG. 3, the lower end of the screw 39 being indicated at 41 and its distance from the lower portion of the cut-out 25 being adjustable such that it will seat on the lower portion of the cut-out constituting the upper end of the central body 28 when a predetermined force is exceeded.

From all of the foregoing description, it will thus be evident that the present invention has provided a very rugged basic load cell unit and combination of such units to provide a flexure isolated electronic scale in which the flexure supports combine both isolating flexure portions and strain gauge measuring portions in single integral rectangular members provided with appropriate cut-outs.

I claim:

1. A load cell including, in combination:
 (a) an end body portion for receiving a load;
 (b) a vertically stationary central body portion;
 (c) first, second and third parallel horizontal elements positioned respectively one below the other in spaced relationship connecting said end body portion to said central body portion, said first and third elements constituting horizontal flexure webs, and said second element being disposed therebetween to function as a load element;
 (d) strain gauge means secured to said load element and responsive to strains developed therein resulting from a downwardly directed load on said end portion tending to move said end portion downwardly relative to said central body portion to provide electrical signals constituting a function of said load, said first and third horizontal flexure webs constraining movement of said end body portion relative to said central body portion to a vertical rectilinear direction to isolate extraneous shear forces from said second horizontal element;

(e) an additional end body portion connected to an opposite end of said central body portion by first, second and third horizontal elements identical to said first mentioned first, second and third horizontal elements to provide two load cells symmetrical with respect to a vertical axis passing midway through said central body portion, said central body portion with its connected end portions defining a first generally rectangular member;

(f) a second generally rectangular member with flexure connected opposite end body portions identical to said first member, said members lying in vertical spaced planes;

(g) a horizontal load plate; and, (h) a horizontal base plate disposed beneath said load plate in spaced parallel relationship, said generally rectangular members being disposed between said load plate and base plate to provide an electronic weighing scale.

2. A flexure isolated electronic scale including, in combination:

(a) a horizontal load plate;

(b) a horizontal base plate disposed beneath said load plate in spaced parallel relationship;

(c) first and second generally rectangular members lying in vertical spaced planes extending between said load plate and base plate, opposite end portions of each rectangular member being symmetrical about a vertical axis passing mid-way therethrough and defining corner flexure supporting means having upper and lower corner posts connected between the vertically opposed corner portions of said load plate and base plate, each rectangular member having cut-out portions defining a horizontally running upper body portion, a horizontally running central body portion, a horizontally running lower body portion and vertically running end body portions, each of said corner flexure supporting means includes:

(i) an upper vertical flexure bar connecting said upper corner post to said upper body portion;

(ii) an upper vertical flexure web connecting said upper body portion to said end body portion;

(iii) first, second and third parallel horizontal elements positioned respectively one below the other in spaced relationship connecting said end body portion to said central body portion, said first and third elements constituting horizontal flexure webs and said second element being disposed therebetween to function as a load element;

(iv) a lower vertical flexure bar connecting said lower body portion to said central body portion, a part of said lower body portion defining said lower corner post; and (d) strain gauge means secured to said load element and responsive to strains developed therein resulting from an applied force on said load plate to cause vertical downward movement of said load plate towards said base plate to provide electrical signals constituting a function of said force, said upper and lower flexure bars functioning as universal flexures with greater resiliency about an axis normal to the plane of the rectangular member than about a horizontal axis lying in the plane of the rectangular member, said upper vertical flexure web isolating bending moments between said upper body portion and said end body portion, and said first and third horizontal flexure webs constraining movement of said end body portion relative to said central body portion to a vertical rectilinear direction to isolate extraneous sheer forces from said second horizontal element whereby said strain gauge means are isolated from extraneous strains resulting from off-center application of said force on said load plate.

3. A scale according to claim 2, including mechanical stop means between portions of said upper body portion and said central body portion to limit downward displacement of said load plate towards said base plate.

4. A scale according to claim 3, including read-out means electrically connected to said strain gage means for providing a visual indication of force applied to said load plate.

* * * * *